United States Patent
Kitajima et al.

(10) Patent No.: US 9,488,721 B2
(45) Date of Patent: Nov. 8, 2016

(54) IMAGE PROCESSING APPARATUS, IMAGE PROCESSING METHOD, COMPUTER PROGRAM, AND MOVABLE BODY

(75) Inventors: Toshihiro Kitajima, Wako (JP); Tomoyuki Kamiyama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 616 days.

(21) Appl. No.: 13/518,930

(22) PCT Filed: Dec. 22, 2010

(86) PCT No.: PCT/JP2010/073216
§ 371 (c)(1),
(2), (4) Date: Jun. 25, 2012

(87) PCT Pub. No.: WO2011/078264
PCT Pub. Date: Jun. 30, 2011

(65) Prior Publication Data
US 2012/0263353 A1 Oct. 18, 2012

(30) Foreign Application Priority Data

Dec. 25, 2009 (JP) ................................. 2009-294345

(51) Int. Cl.
G06K 9/46 (2006.01)
G01S 7/48 (2006.01)
G06T 5/00 (2006.01)
G06T 7/00 (2006.01)
G06T 5/20 (2006.01)

(52) U.S. Cl.
CPC ............. *G01S 7/4802* (2013.01); *G06T 5/002* (2013.01); *G06T 5/20* (2013.01); *G06T 7/0085* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 5,966,678 A * | 10/1999 | Lam | 702/97 |
| 2004/0057601 A1* | 3/2004 | Honda | 382/104 |
| 2008/0027591 A1* | 1/2008 | Lenser et al. | 701/2 |
| 2008/0201014 A1* | 8/2008 | Sonoura | 700/250 |
| 2011/0285910 A1* | 11/2011 | Bamji | G01S 17/89 348/631 |

FOREIGN PATENT DOCUMENTS

| | | |
|---|---|---|
| JP | 07-318648 A | 12/1995 |
| JP | 2002-277239 A | 9/2002 |
| JP | 2004-108980 A | 4/2004 |
| JP | 2006-153773 A | 6/2006 |
| JP | 2009-193240 A | 8/2009 |

OTHER PUBLICATIONS

Wiedemann, M., Sauer, M., Driewer, F., & Schilling, K. (Jul. 2008). Analysis and characterization of the PMD camera for application in mobile robotics. In Proceedings of the 17th IFAC World Congress (pp. 6-11).*

Radmer, Jochen, et al. "Incident light related distance error study and calibration of the PMD-range imaging camera." Computer Vision and Pattern Recognition Workshops, 2008. CVPRW'08. IEEE Computer Society Conference on. IEEE, 2008.*

Japanese Notice of Allowance application No. 2011-547611 dated Sep. 2, 2014.

International Search Report corresponding to International Patent Application No. PCT/JP2010/073216 dated Mar. 29, 2011.

* cited by examiner

*Primary Examiner* — Vikkram Bali
*Assistant Examiner* — Tracy Mangialaschi
(74) *Attorney, Agent, or Firm* — Squire Patton Boggs (US) LLP

(57) ABSTRACT

An image processing apparatus includes an edge extracting section which extracts an edge in a range image and a removing section which removes a distance value of a pixel of an edge part extracted by the edge extracting section in the range image.

1 Claim, 13 Drawing Sheets

FIG. 2A

| -1 | 0 | 1 |
|---|---|---|
| -2 | 0 | 2 |
| -1 | 0 | 1 |

FIG. 2B

| 1 | 2 | 1 |
|---|---|---|
| 0 | 0 | 0 |
| -1 | -2 | -1 |

FIG. 2C

| 0 | 1 | 0 |
|---|---|---|
| 1 | -4 | 1 |
| 0 | 1 | 0 |

IMAGE PROCESSING APPARATUS, IMAGE PROCESSING METHOD, COMPUTER PROGRAM, AND MOVABLE BODY

TECHNICAL FIELD

The present invention relates to technology for reducing noise in a distance measurement result.

Priority is claimed on Japanese Patent Application No. 2009-294345, filed Dec. 25, 2009, the contents of which are incorporated herein by reference.

BACKGROUND ART

In the related art, distance measuring technology for measuring a distance to a target object by receiving reflection light of light emitted from a predetermined light source has been proposed. For example, Patent Document 1 discloses a range image sensor for measuring a distance to a target object using a phase difference between a light projection time and a light reception time of intensity-modulated light.

DOCUMENTS OF THE PRIOR ART

Patent Documents

[Patent Document 1] Japanese Unexamined Patent Application, First Application No. 2006-153773

DISCLOSURE OF INVENTION

Problem to be Solved by the Invention

However, the distance measuring technology of the related art measures a distance to a reference point on the condition that light reflecting from one position on a target object is received. Thus, there is a problem in that the accuracy of distance measurement is degraded when a distance of a position at which a distance between a front part (a part of a person in this case), for example, such as a contour part of the person standing apart from a wall, and a rear part (a part of the wall in this case) rapidly varies is measured. That is, among light emitted from predetermined light sources, part of the light is reflected by the front part and the remaining light is reflected by the rear part. Thus, even when a distance of the same position is measured, reflection light from a plurality of positions is received as a result. Accordingly, there is a problem in that the accuracy of measurement is degraded as the entire measurement result.

The present invention has been made in view of such circumstances, and an object of the invention is to provide technology capable of preventing the accuracy of measurement from being degraded even when part of which a distance to be measured rapidly varies is included in a measurement area.

Means for Solving the Problem

According to an aspect of the present invention, there is provided an image processing apparatus (for example, a distance measuring apparatus 10 or 10a or an object extracting apparatus 20 in an embodiment) including: an edge extracting section (for example, an edge filter 102 or 102b in the embodiment) which extracts an edge in a range image; and a removing section (for example, a denoising section 103 in the embodiment) which removes a distance value of a pixel of an edge part extracted by the edge extracting section in the range image.

According to an aspect of the present invention, the image processing apparatus further includes: an object extracting section (for example, an object extracting section 201 in the embodiment) which extracts an image of a predetermined object (for example, a target object in the embodiment) from the range image in which the distance value of the pixel of the edge part has been removed by the removing section, wherein the edge extracting section extracts the edge in the range image input after the image of the object has been extracted by the object extracting section using different threshold values for a pixel of a position at which the image of the object has been extracted and a pixel of a position at which the image of the object has not been extracted.

According to an aspect of the present invention, there is provided an image processing method including: an edge extracting step of extracting, by an image processing apparatus, an edge in a range image; and a removing step of removing, by the image processing apparatus, a distance value of a pixel of an edge part extracted by the edge extracting step in the range image.

According to an aspect of the present invention, there is provided a computer program for causing a computer to execute: an edge extracting step of extracting an edge in a range image; and a removing step of removing a distance value of a pixel of an edge part extracted by the edge extracting step in the range image.

According to an aspect of the present invention, there is provided a movable body (for example, a two-legged robot 50 in an embodiment) including: the image processing apparatus (for example, a distance measuring apparatus 10, 10a, or 10b or an object extracting apparatus 20 in the embodiment); a distance measuring section (for example, an optical distance measuring section 101 or 101a) which captures the range image; an impact timing estimating section (for example, an impact timing estimating section 504 in the embodiment) which estimates a timing when an impact to the distance measuring section occurs; a distance estimating section (for example, a distance estimating section 505 in the embodiment) which estimates a distance value included in the range image captured by the distance measuring section at the timing at which the impact occurs; and a determination section (for example, a determination section 506 in the embodiment) which determines reliability of the range image by comparing the range image captured by the distance measuring section to a result of estimation by the distance estimating section at the timing at which the impact occurs.

Effect of the Invention

In the present invention, it is possible to prevent the accuracy of measurement from being degraded even when part of which a distance to be measured rapidly varies is included in a measurement area. More specifically, because the part of which the distance to be measured rapidly varies is extracted as an edge and a distance value of a pixel of an edge part is removed, it is possible to remove a distance value incorrectly measured in the edge part.

In addition, in a configuration further including the above-described object extracting section, it is possible to acquire detailed surface information without removing a distance value even in an edge part in an image of an object itself extracted by the object extracting section.

In addition, the above-described movable body can determine reliability for a measurement result when an impact has occurred. Thus, it is possible to suppress the degradation of the accuracy of processing by avoiding processing using a measurement result of which reliability is low.

BRIEF DESCRIPTION OF THE DRAWINGS

FIG. 2A is a diagram illustrating a specific example of a Sobel filter for use in edge extraction of a horizontal direction.

FIG. 2B is a diagram illustrating a specific example of a Sobel filter for use in edge extraction of a vertical direction.

FIG. 2C is a diagram illustrating a specific example of a Laplacian filter.

FIG. 5C is an image illustrating three-dimensional (3D) coordinates of the human body and the wall surface based on pixel values in the range image, an installation position of the optical distance measuring section, and the like.

FIG. 5D is an image illustrating 3D coordinates of the human body and the wall surface based on pixel values in a denoised range image, the installation position of the optical distance measuring section, and the like.

EMBODIMENTS FOR CARRYING OUT THE INVENTION

First Embodiment

Figure 1:
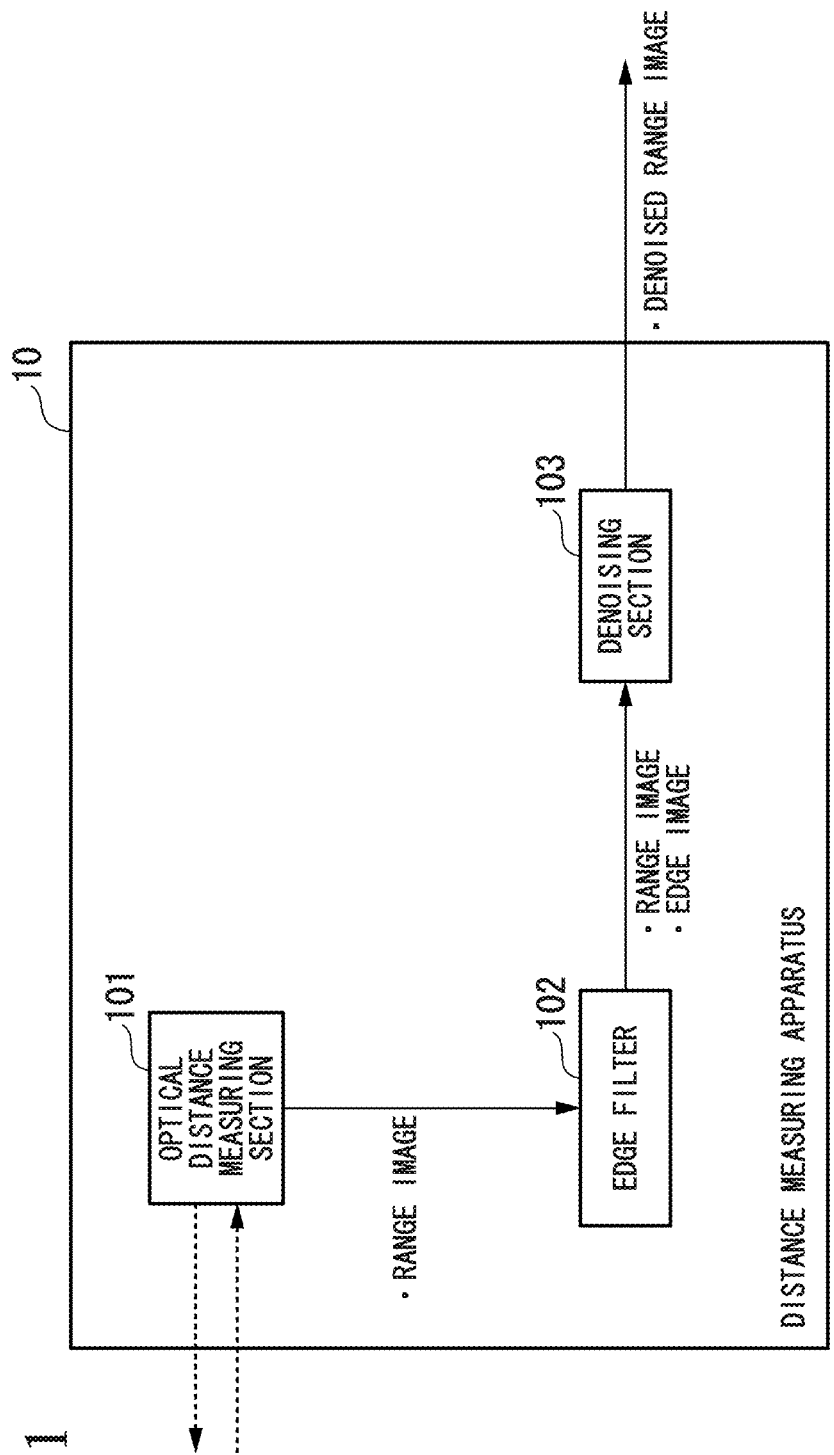
FIG. 1 is a schematic block diagram illustrating a functional configuration of a distance measuring apparatus according to a first embodiment.

FIG. 1 is a schematic block diagram illustrating a functional configuration of a distance measuring apparatus 10 according to the first embodiment. The distance measuring apparatus 10 includes a central processing unit (CPU), a memory, and/or an auxiliary storage apparatus connected by a bus, and functions as an apparatus including an optical distance measuring section 101, an edge filter 102, and a denoising section 103 by executing a program for distance measurement. All or some functions of the distance measuring apparatus 10 may be implemented using hardware such as an application specific integrated circuit (ASIC), a programmable logic device (PLD), and/or a field programmable gate array (FPGA). In addition, the program for distance measurement may be recorded on a flexible disk, a magneto-optical disc, a read only memory (ROM), or a portable recording medium such as a compact disc-ROM (CD-ROM), as well as a recording medium such as a memory or an auxiliary storage apparatus embedded in a computer as described above. The computer may function as the distance measuring apparatus 10 by reading the program for distance measurement recorded on the recording medium.

The optical distance measuring section 101 includes a light emitting section and a light receiving section. The optical distance measuring section 101 measures a distance to an object reflecting light by emitting light from the light emitting section and receiving its reflection light by means of the light receiving section. The light receiving section of the optical distance measuring section 101 has a plurality of unit light-receiving elements, and measures a distance to a reflection point of received light for each unit light-receiving element. The reflection point is a point at which light emitted from the light emitting section intersects an object surface. The unit light-receiving element is configured using one or more light receiving elements such as charge coupled device (CCD) image sensors or complementary metal oxide semiconductors (CMOSs), and is configured as a unit for measuring a distance corresponding to one reflection point.

For example, the optical distance measuring section 101 emits a predetermined light beam (infrared light, laser light, or the like) from the light emitting section. The light beam emitted from the light emitting section reflects at a point (reflection point) on the surface of the object positioned in a measurement area. The optical distance measuring section 101 receives the reflection light from the object by means of the light receiving section, and measures a distance to each observation point based on a period of time from light emission to light reception and a light speed, and/or deviation in a phase of intensity-modulated light. A specific example of the optical distance measuring section 101 as described above is an optical distance sensor for measuring a distance according to a time of flight (TOF) method. Technology to be applied to the optical distance measuring section 101 is not limited to the TOF method as described above. The technology to be applied to the optical distance measuring section 101 may be any technology capable of measuring a distance by measuring a TOF of light. The optical distance measuring section 101 generates and outputs a range image representing a distance to a reflection point measured in each unit light-receiving element. The range image is an image generated by setting a value of a distance measured by a unit light-receiving element corresponding to each pixel to a pixel value of each pixel.

The edge filter 102 extracts an edge in the range image generated by the optical distance measuring section 101, and generates an image (edge image) representing the extracted edge. Specifically, the edge filter 102 calculates an edge evaluation value for each pixel of the range image by applying a filter for edge extraction. The edge filter 102 extracts a pixel having an edge evaluation value larger than a predetermined threshold value as an edge. The predetermined threshold value is given in advance for the edge filter 102. Specific examples of the filter for edge extraction are a Sobel filter, a Laplacian filter, a Canny filter, and the like. More specifically, an example of the filter for edge extraction is a filter with a size of 3□3, and is a filter for convoluting the entire area of the range image or a predetermined area. The edge extracting section 100 generates and outputs the edge image from the input range image. The edge image is an image representing the extracted edge part and a non-edge part. An example of the edge image is a binary image in which the edge part is denoted by "1," and the non-edge part is denoted by "0." FIGS. 2A to 2C are diagrams illustrating specific examples of the filter for edge extraction. FIG. 2A is a diagram illustrating the specific example of the Sobel filter for use in edge extraction of a horizontal direction. FIG. 2B is a diagram illustrating the specific example of the Sobel filter for use in edge extraction of a vertical direction. FIG. 2C is a diagram illustrating the specific example of the Laplacian filter. The edge filter 102 may extract an edge using the filter for edge extraction as illustrated in FIGS. 2A to 2C. When the Sobel filter is used, it is preferable that the edge filter 102 perform processing using both the filter for edge extraction illustrated in FIG. 2A and the filter for edge extraction illustrated in FIG. 2B.

The denoising section 103 removes noise from the range image based on the edge image generated by the edge filter 102. Specifically, the denoising section 103 removes distance data of a pixel serving as an edge part in the edge image as noise among pixels of the range image. The denoising section 103 outputs the range image from which distance values of all the pixels serving as edge parts have been removed as a denoised range image. The denoising section 103 removes noise, for example, by assigning "0" or "NULL" to the pixel value of each pixel serving as the edge part. An area serving as the edge part is an area in which a distance value rapidly varies, and is an area in which the accuracy of measurement is degraded. The denoising section 103 removes an area in which the accuracy of measurement is degraded as noise by performing the above-described process.

Figure 3:
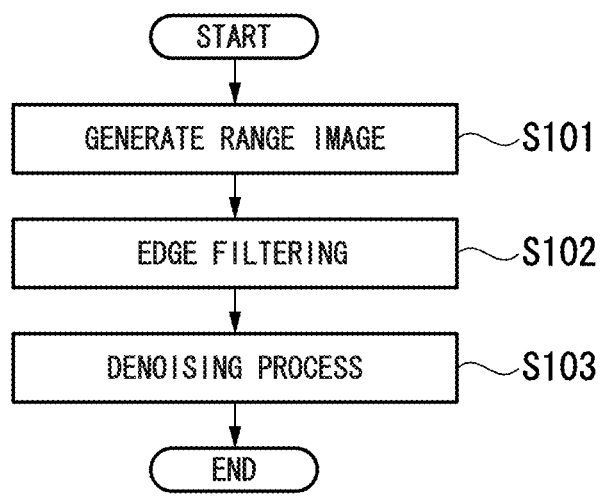
FIG. 3 is a flowchart illustrating a flow of processing of the distance measuring apparatus according to the first embodiment.

FIG. 3 is a flowchart illustrating a flow of processing of the distance measuring apparatus 10 according to the first embodiment. First, the optical distance measuring section 101 generates and outputs a range image (step S101). Next, the edge filter 102 extracts an edge by applying the filter for edge extraction to the range image. The edge filter 102 generates and outputs an edge image (step S102). Next, the denoising section 103 removes noise from the range image based on the edge image (step S103).

Figure 4:
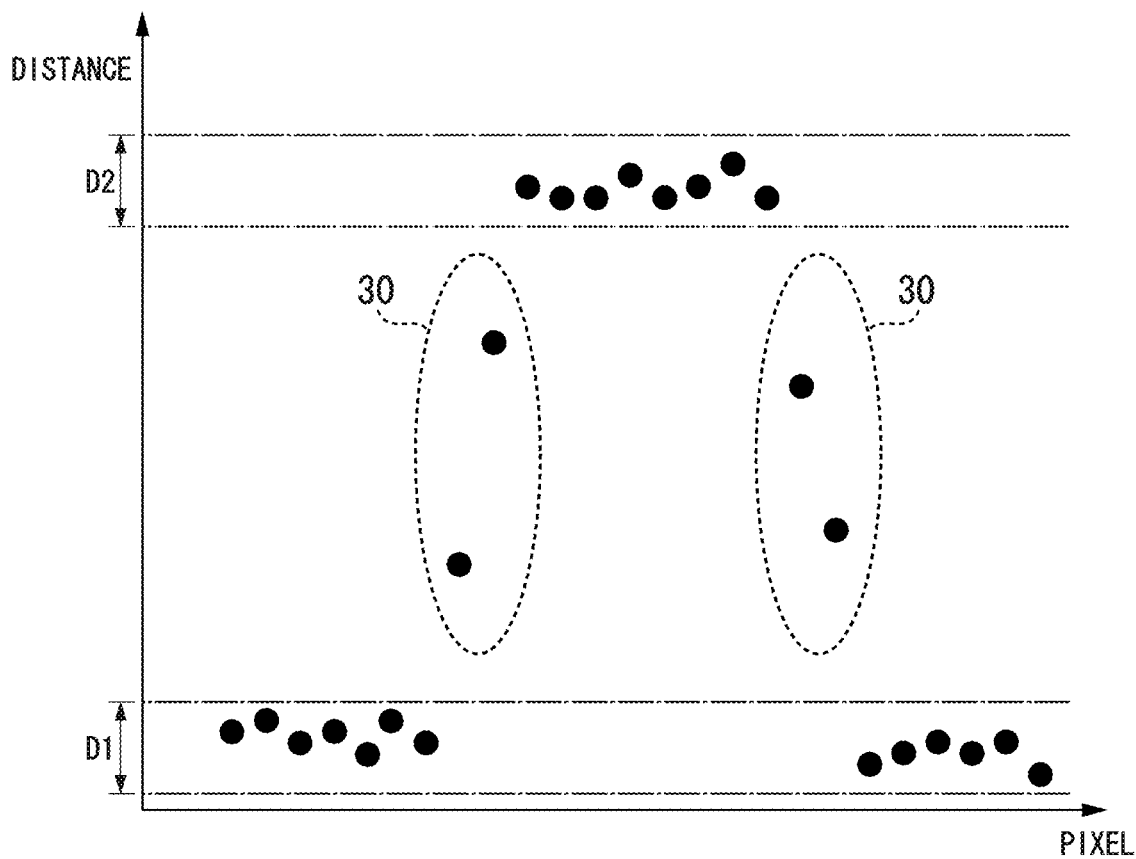
FIG. 4 is a diagram schematically illustrating a denoising process by a denoising section.

FIG. 4 is a diagram schematically illustrating a denoising process by the denoising section 103. In FIG. 4, the horizontal axis represents a pixel sequence and the vertical axis represents a distance value stored as a pixel value of each pixel. If there is a part in which the distance from the optical distance measuring section 101 rapidly varies within a measurement area, an actual measured value of the distance in this part becomes noise different from an actual distance value. In FIG. 4, a distance value within a noise area 30 surrounded by a dashed line is different from an actual distance value. Actually, the distance value within the noise area 30 is a value to be included in any of a range D1 and a range D2.

This phenomenon occurs for the following reasons. The unit light-receiving element corresponding to each pixel of the noise area 30 receives light reflected by an object positioned at the distance of D1 and light reflected by an object positioned at the distance of D2. The optical distance measuring section 101 calculates a distance as a value not belonging to the range D1 and the range D2 in order to measure the distance based on received light of the two.

Figure 5A:
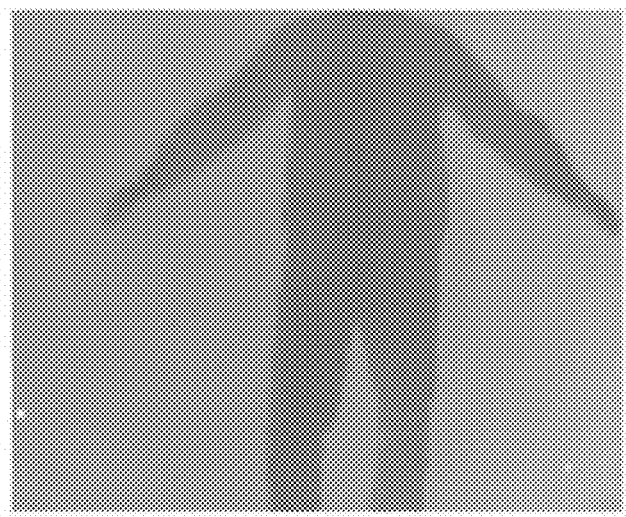
FIG. 5A is a diagram illustrating a specific example of a range image obtained by imaging a wall surface and a human body in front of the wall surface by an optical distance measuring section.

FIGS. 5A to 5D are diagrams illustrating specific examples of a range image obtained by imaging a wall surface and a human body in front of the wall surface by an optical distance measuring section 101. FIG. 5A is a diagram illustrating the specific example of the range image. In FIG. 5A, the range image is illustrated as a grayscale image based on a distance value in each pixel. As is obvious from FIG. 5A, parts of the human body are substantially at the same distance and thus are expressed in color having substantially the same grayscale. Parts of the wall surface are also substantially at the same distance and thus are expressed in color having substantially the same grayscale as in the parts of the human body. On the other hand, because a distance rapidly varies in a boundary portion between the human body and the wall surface, grayscale color rapidly varies.

Figure 5B:
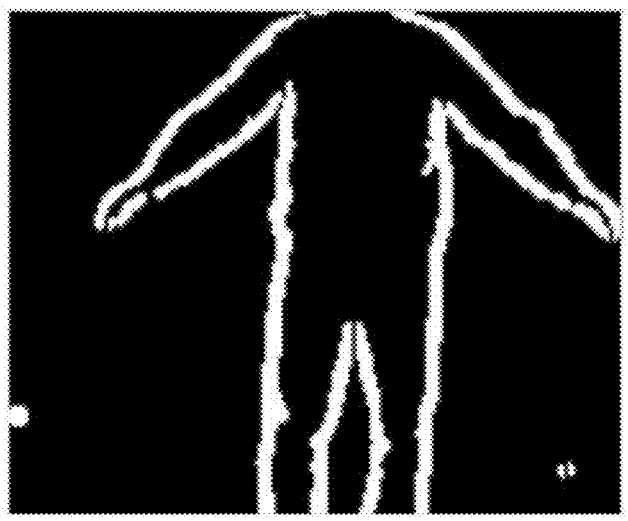
FIG. 5B is a diagram illustrating a specific example of an edge image.
Figure 5C:
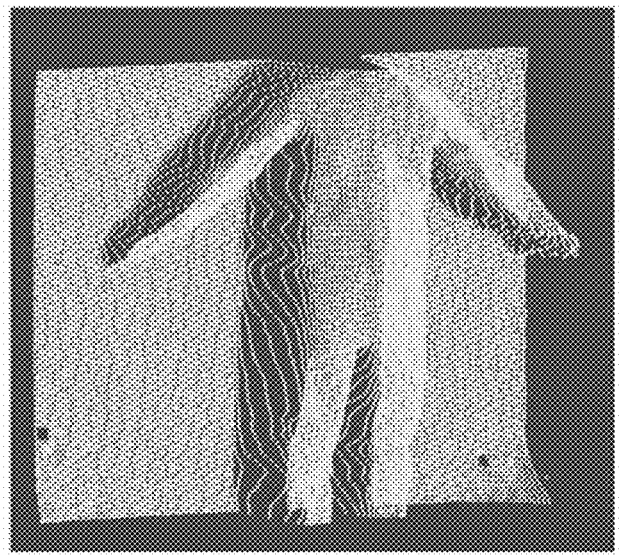
Figure 5D:
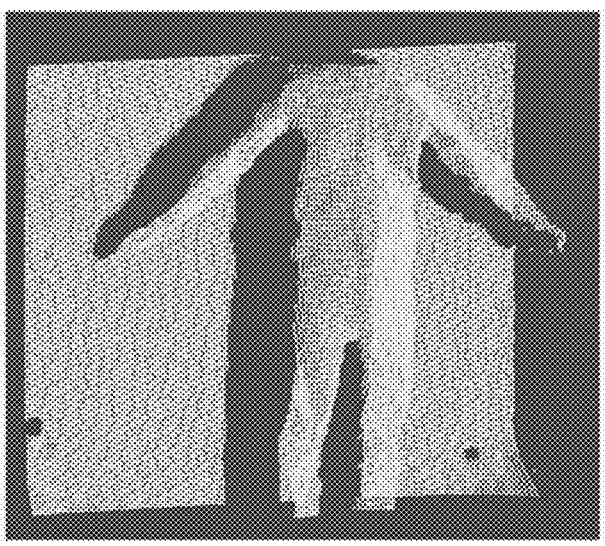

FIGS. 5B to 5D are all diagrams generated from the range image of FIG. 5A. FIG. 5B is a diagram illustrating the specific example of the edge image. In FIG. 5B, the edge image is represented as a black-and-white image in which an edge part extracted based on a predetermined threshold value is a bright part (of which the pixel value is 1) and a non-edge part is a dark part (of which the pixel value is 0). As is obvious from FIG. 5B, parts of the human body are substantially at the same distance and thus are expressed as dark parts from which no edge is extracted. Parts of the wall surface are also substantially at the same distance and thus are expressed as dark parts from which no edge is extracted. On the other hand, because a distance rapidly varies in the boundary portion between the human body and the wall surface, the boundary portion is expressed as a bright part from which the edge is extracted.

FIG. 5C is an image expressing 3D coordinates of the human body and the wall surface based on pixel values in the range image, the installation position of the optical distance measuring section 101, and the like. FIG. 5D is an image expressing 3D coordinates of the human body and the wall surface based on pixel values in a denoised range image, the installation position of the optical distance measuring section 101, and the like. As is apparent from FIG. 5C, there is a pixel having a value (noise) between a distance to the human body and a distance to the wall surface in the boundary portion between the human body and the wall surface in the range image before denoising. On the other hand, as is apparent from FIG. 5D, there is no pixel having a value (noise) between the distance to the human body and the distance to the wall surface in the boundary portion between the human body and the wall surface in the denoised range image. That is, a distance value, which is actually absent, is removed from the denoised range image.

In the distance measuring apparatus 10 configured as described above, an edge is extracted in the range image and a pixel value (distance value) of an edge part is removed as noise. Thus, even when a part of which a distance rapidly varies is included in the measurement area, it is possible to remove noise occurring in the part as described above. Accordingly, it is possible to prevent the accuracy of measurement from being degraded due to noise.

In addition, there is a problem in that a measurement error increases when an impact has been applied to the optical distance measuring section 101. For example, although the accuracy of distance measurement is degraded as described above in a position in which a distance between a front part and a rear part rapidly varies, an area in which the accuracy is degraded is similarly extended. For example, even when the boundary part is an area having a one-pixel width when no impact is applied to the optical distance measuring section 101, the boundary part extends to an area having a width of several pixels when an impact is applied. This impact occurs, for example, when the optical distance measuring section 101 is mounted on a moving robot or when the optical distance measuring section 101 performs a pan, roll, or tilt operation. In order to solve this problem, it is possible to suppress the degradation of accuracy in the above-described distance measuring apparatus 10.

Modified Example

The edge filter 102 may be configured to perform a thinning process for the edge image. In particular, it is preferable that the edge filter 102 perform the thinning process when the Sobel filter is applied as a specific example of the filter for edge extraction. For example, the specific example of the thinning process is a Hilditch technique or the like. By performing the thinning process as described above, the denoising section 103 can prevent distance data of a non-noise part from being removed.

In addition, the denoising section 103 may be configured to assign a value obtained based on peripheral pixels other than the edge as a new pixel value for a pixel from which a distance value as noise has been removed. For example, the denoising section 103 may be configured to assign an average value of distance values of pixels positioned in one of one area and the other area having an edge boundary as pixels other than the edge among pixels of an area of eight pixels around the pixel to the pixel from which the distance value has been removed.

In addition, the distance measuring apparatus 10 may be configured without the optical distance measuring section 101. The distance measuring apparatus 10 configured as described above receives an input of a range image from another apparatus and outputs a denoised range image.

In addition, a threshold value to be used by the edge filter 102 may be preset according to the accuracy of measurement of the optical distance measuring section 101. For example, if the accuracy of measurement (variation) of a distance is 10 cm, a value (for example, 50 cm) sufficiently greater than 10 cm may be selected as the threshold value.

In addition, the edge filter 102 may change the magnitude of the threshold value to be applied to a pixel according to a distance value in each pixel of the range image. For example, the edge filter 102 may generate the edge image using a smaller value as the threshold value when a distance value is small and using a larger value as the threshold value when the distance value is large. In general, when the distance value is smaller, the accuracy of measurement of the optical distance measuring section 101 becomes higher. When the distance value is larger, the accuracy of measurement of the optical distance measuring section 101 becomes lower. Thus, according to the configuration as described above, it is possible to adaptively set a threshold value corresponding to the accuracy and remove noise according to the accuracy of measurement.

In addition, when the edge image is generated, the edge filter 102 may further apply a filter for a distance value. For example, the edge filter 102 may assign a value of "1" indicating the edge part to a pixel of which a distance value is greater than a predetermined value (for example, 1 m or the like), regardless of an edge evaluation value. According to the configuration as described above, it is possible to designate only an object located within a predetermined distance as a processing target. The edge filter 102 may assign a value "1" indicating the edge part to a pixel having a pixel of which a distance value is larger than the predetermined value, regardless of an edge evaluation value.

Second Embodiment

Figure 6:
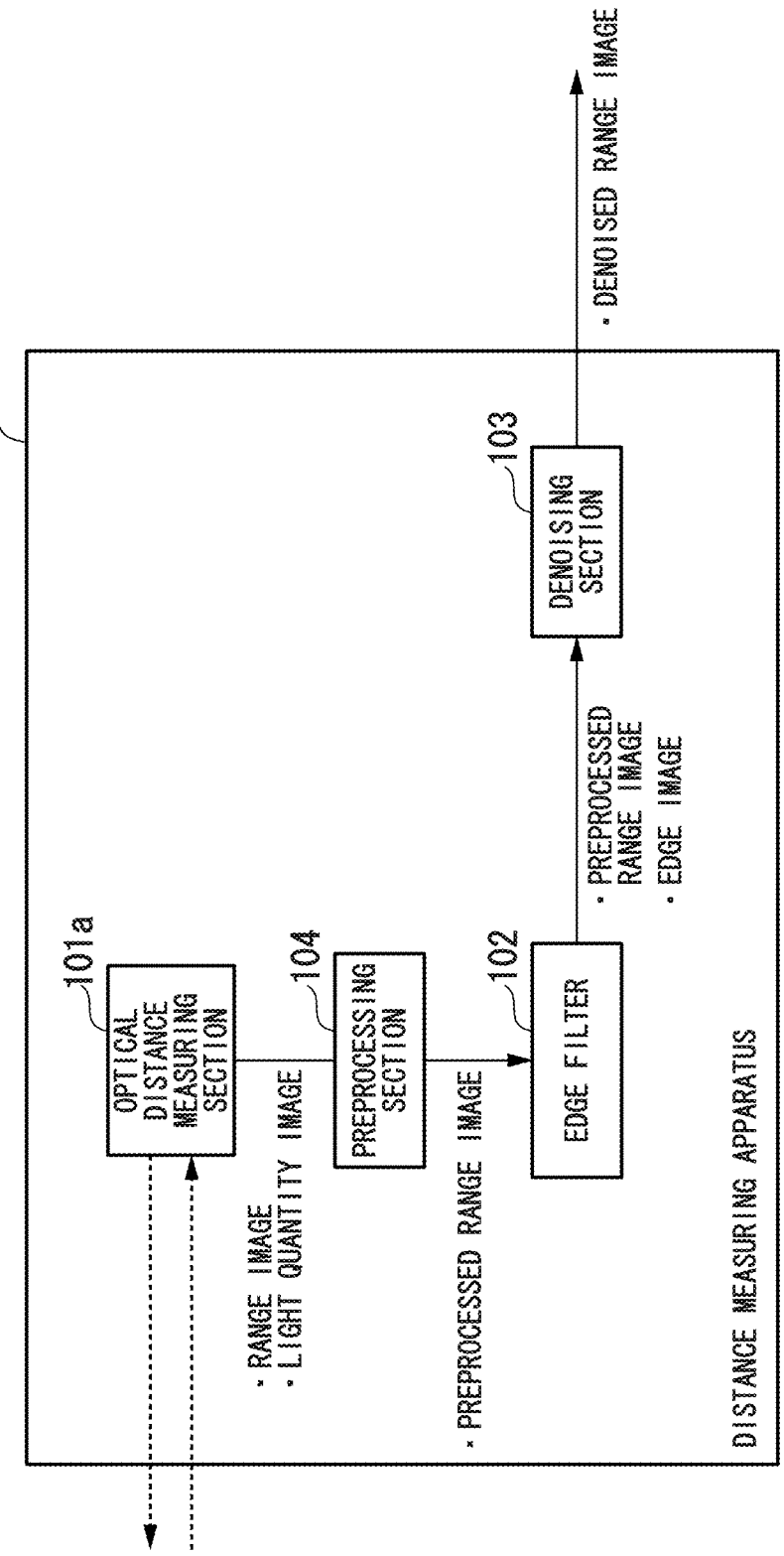
FIG. 6 is a schematic block diagram illustrating a functional configuration of a distance measuring apparatus according to a second embodiment.

FIG. 6 is a schematic block diagram illustrating a functional configuration of a distance measuring apparatus 10*a* according to the second embodiment. The distance measuring apparatus 10*a* according to the second embodiment is different from the distance measuring apparatus 10 according to the first embodiment in that an optical distance measuring section 101*a* is provided in place of the optical distance measuring section 101 and a preprocessing section 104 is further provided, and the remaining configurations are the same as those of the distance measuring apparatus 10.

The optical distance measuring section 101*a* further generates and outputs a luminance image in addition to a range image. A light receiving section of the optical distance measuring section 101*a* measures a luminance value (intensity value) of received light for each unit light-receiving element. The luminance image is an image generated by designating the luminance value measured by the unit light-receiving element corresponding to each pixel as a pixel value of each pixel.

The preprocessing section 104 performs a ghost removing process (alias removing process) and a smoothing process. In addition, the ghost removing process will be described. The preprocessing section 104 removes a pixel value (distance value) of a ghost part from the range image. The ghost is an image occurring when a distance is measured using a phase difference between a light projection time and a light reception time of intensity-modulated light. That is, the ghost is an image generated by measuring a distance to an object as a distance shorter than an actual distance and assigning an incorrect distance value to a pixel when the distance to the object is longer than a wavelength of intensity-modulated light. The preprocessing section 104 compares the luminance value of each pixel of the luminance image to a predetermined threshold value, and detects a pixel having a luminance value smaller than the predetermined threshold value. The preprocessing section 104 removes a pixel value (distance value) corresponding to a pixel detected by the above-described process among pixels of the range image. Specifically, "0" or "NULL" is assigned to the pixel value as the removal of the pixel value. Because the distance of the ghost part from the object is farther than other parts as described above, the intensity of light is attenuated as compared to light received by the other parts. Thus, it is possible to remove the ghost part according to the process as described above.

Next, the smoothing process will be described. The preprocessing section 104 smoothes a pixel value (distance value) by applying a smoothing filter to a range image subjected to the ghost removing process. Specific examples of the smoothing filter are a median filter, a Gaussian filter, and the like. The preprocessing section 104 generates a preprocessed range image by performing the ghost removing process and the smoothing process for the range image. In the distance measuring apparatus 10*a* according to the second embodiment, the edge filter 102 and the denoising section 103 designate the preprocessed range image as a processing target in place of the range image.

Figure 7:
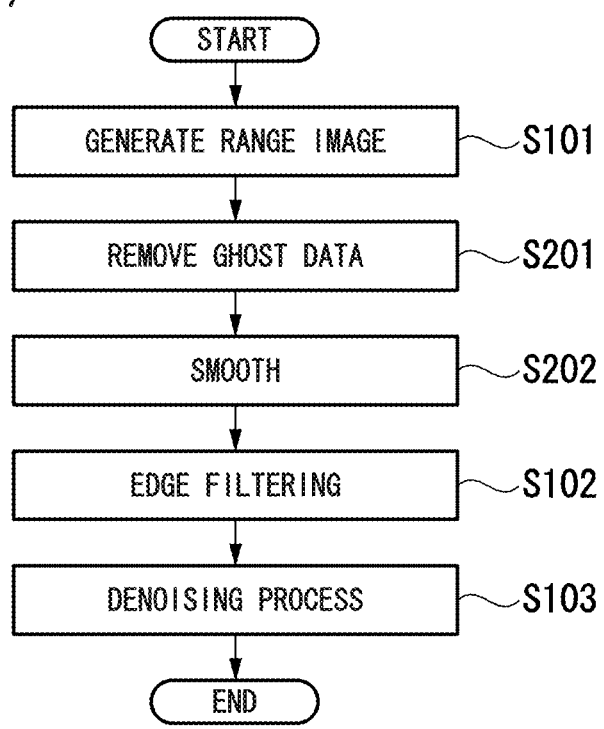
FIG. 7 is a flowchart illustrating a flow of processing of the distance measuring apparatus according to the second embodiment.

FIG. 7 is a flowchart illustrating a flow of processing of the distance measuring apparatus 10*a* according to the second embodiment. First, the optical distance measuring section 101a generates and outputs a range image (step S101). Next, the preprocessing section 104 performs a ghost removing process based on the range image and a luminance image (step S201). Next, the preprocessing section 104 performs a smoothing process for the range image subjected to the ghost removing process (step S202). Next, the edge filter 102 extracts an edge by applying the filter for edge extraction to a preprocessed range image. The edge filter 102 generates and outputs an edge image (step S102). Next, the denoising section 103 removes noise from the preprocessed range image based on the edge image (step S103).

In the distance measuring apparatus 10a configured as described above, the ghost removing process is performed by the preprocessing section 104. Thus, the processing of the edge filter 102 can prevent an edge of an image (ghost) of an object, which does not actually exist at its distance, from being extracted. In addition, because the smoothing process is performed by the preprocessing section 104, it is possible to prevent an edge of small noise from being unnecessarily extracted. Accordingly, the denoising section 103 can prevent a distance value from being incorrectly removed even though a pixel is actually a non-edge part.

Modified Example

The distance measuring apparatus 10a according to the second embodiment may be modified and configured as in the modified example of the distance measuring apparatus 10 according to the first embodiment.

Third Embodiment

Figure 8:
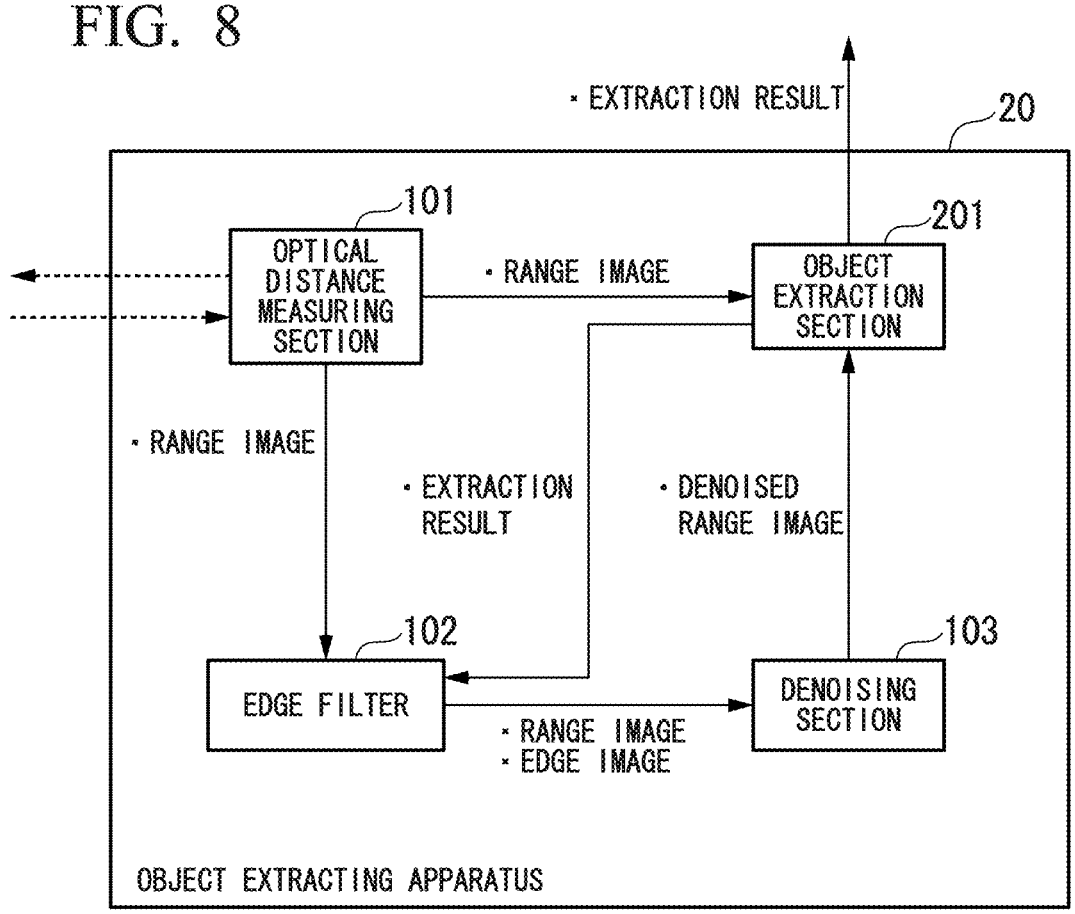
FIG. 8 is a schematic block diagram illustrating a functional configuration of an object extracting apparatus according to a third embodiment.

FIG. 8 is a schematic block diagram illustrating a functional configuration of an object extracting apparatus 20 according to the third embodiment. The object extracting apparatus 20 includes a CPU, a memory, and/or an auxiliary storage apparatus connected by a bus, and functions as an apparatus including an optical distance measuring section 101, an edge filter 102b, a denoising section 103, and an object extracting section 201 by executing a program for object extraction. All or some functions of the object extracting apparatus 20 may be implemented using hardware such as an ASIC, a PLD, and/or an FPGA.

Configurations of the optical distance measuring section 101 and the denoising section 103 are the same as the optical distance measuring section 101 and the denoising section 103 according to the first embodiment. Thus, description of the optical distance measuring section 101 and the denoising section 103 is omitted.

The object extracting section 201 extracts an image of an object (hereinafter referred to as a "target object") as an extraction target based on a denoised range image from which noise has been removed by the denoising section 103. The target object may be any object, and may be appropriately set by a designer or user of the object extracting apparatus 20. For example, a human body, a human face, a face of a specific person, or a vehicle body is set as the target object. Any existing technology may be applied to technology for the object extracting section 201 to extract an image of the target object from the denoised range image. For example, the object extracting section 201 may be configured to extract the image of the target object by storing a feature quantity previously extracted from a stereoscopic image of a sample of the target object, extracting a feature quantity from the denoised range image, and comparing the stored feature quantity to the extracted feature quantity.

When the target object is extracted, the object extracting section 201 reports a position of the image of the target object to the edge filter 102b as an extraction result.

The edge filter 102b changes a threshold value to be used when the edge is extracted in the range image based on the extraction result reported from the object extracting section 201. Specifically, the edge filter 102b determines a threshold value to be applied to each pixel when an edge is extracted in a range image newly obtained by the optical distance measuring section 101 based on the extraction result related to a previous range image. More specifically, the edge filter 102b sets a high threshold value (a threshold value in which an edge is more difficult to extract) for an inner pixel of an area from which the target object has been extracted in a previous range image as compared to an outer pixel. Thus, a pixel for which the same edge evaluation value has been calculated is not extracted as an edge when the target object is an inner pixel of an area from which the target object has been extracted, and is extracted as an edge when the target object is an outer pixel of the area from which the target object has been extracted.

Figure 9:
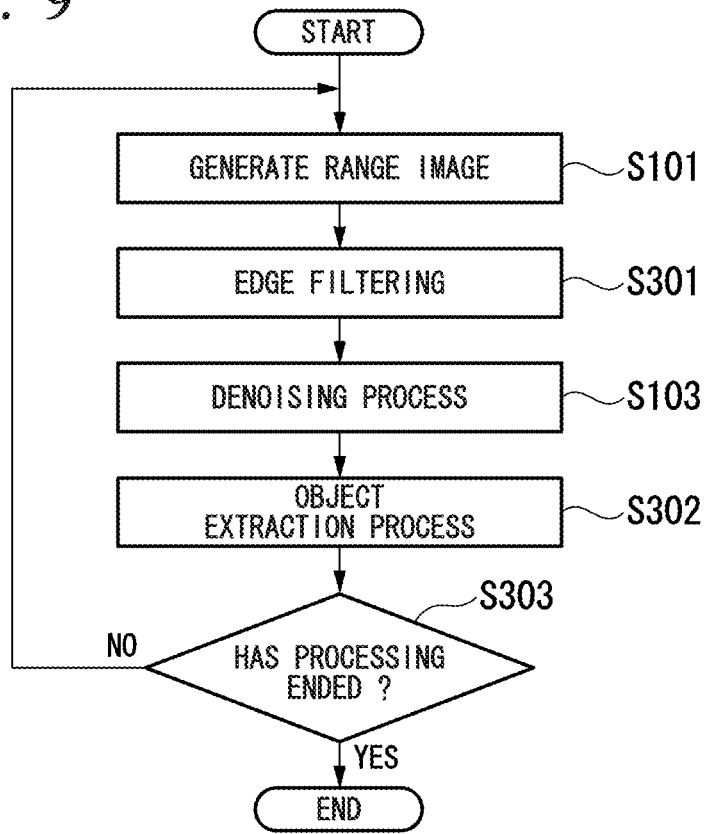
FIG. 9 is a flowchart illustrating a flow of processing of the object extracting apparatus according to the third embodiment.

FIG. 9 is a flowchart illustrating a flow of processing of the object extracting apparatus 20 according to the third embodiment. First, the optical distance measuring section 101 generates and outputs a range image (step S101). Next, the edge filter 102b extracts an edge by applying the filter for edge extraction to the range image based on an extraction result generated by the object extracting section 201 in a previous process. The edge filter 102b generates and outputs the edge image (step S301). In the process of step S301, the edge filter 102b extracts an edge based on an initial threshold value assigned in advance because there is no extraction result by the object extracting section 201 in a first loop.

Next, the denoising section 103 removes noise from the range image based on the edge image (step S103). Next, the object extracting section 201 extracts an image of a target object based on a denoised range image (step S302), and outputs an extraction result. The above process is iterated until a processing end instruction is provided to the object extracting apparatus 20 (step S303).

In the object extracting apparatus 20 configured as described above, the edge filter 102b changes a threshold value when the edge filter 102b extracts an edge based on the extraction result by the object extracting section 201. Thus, a pixel for which the same edge evaluation value has been calculated is not extracted as an edge when the target object is an inner pixel of an area from which the target object has been extracted, and is extracted as an edge when the target object is an outer pixel of the area from which the target object has been extracted. Accordingly, for the image of the target object itself as compared to an image other than the target object, a distance value is difficult to remove as noise. As a result, for the image of the target object itself, a distance value is not removed for the edge part either, and detailed surface information can be acquired.

In addition, because a distance value of the edge part is removed as noise outside an area from which the target object has been extracted, the accuracy of distance measurement can be improved. Specifically, when the object extracting section 201 performs object extraction, it is possible to prevent an incorrect extraction process from being performed due to an influence of an incorrect distance value occurring in an edge part.

Modified Example

The edge filter 102b may be configured to perform a thinning process for an edge image. In particular, it is desirable that the edge filter 102b perform the thinning process when the Sobel filter has been applied as a specific example of the filter for edge extraction. A specific example of the thinning process is a Hilditch technique or the like. It is possible to prevent distance data of a non-noise part from being removed in the denoising section 103 by performing this thinning process.

In addition, the denoising section 103 may be configured so that a value obtained based on peripheral pixels other than the edge is assigned as a new pixel value for a pixel of which a distance value has been removed as noise. For example, the denoising section 103 may be configured to assign an average value of distance values of pixels positioned in one of one area and the other area having an edge boundary as pixels other than the edge among pixels in an area of eight pixels around the pixel to the pixel from which the distance value has been removed.

In addition, the object extracting apparatus 20 may be configured without the optical distance measuring section 101. The object extracting apparatus 20 configured as described above receives an input of a range image from another apparatus, and outputs an extraction result.

In addition, the object extracting section 201 may be configured to extract a plurality of different target objects. In the configuration as described above, the edge filter 102b may be configured to further store a threshold value that differs according to each target object to be extracted. According to the configuration as described above, the edge filter 102b performs edge extraction based on a threshold value corresponding to a type of extracted target object. Thus, it is possible to control a degree of an edge part of which a distance value is removed for each type of target object.

Fourth Embodiment

Figure 10:
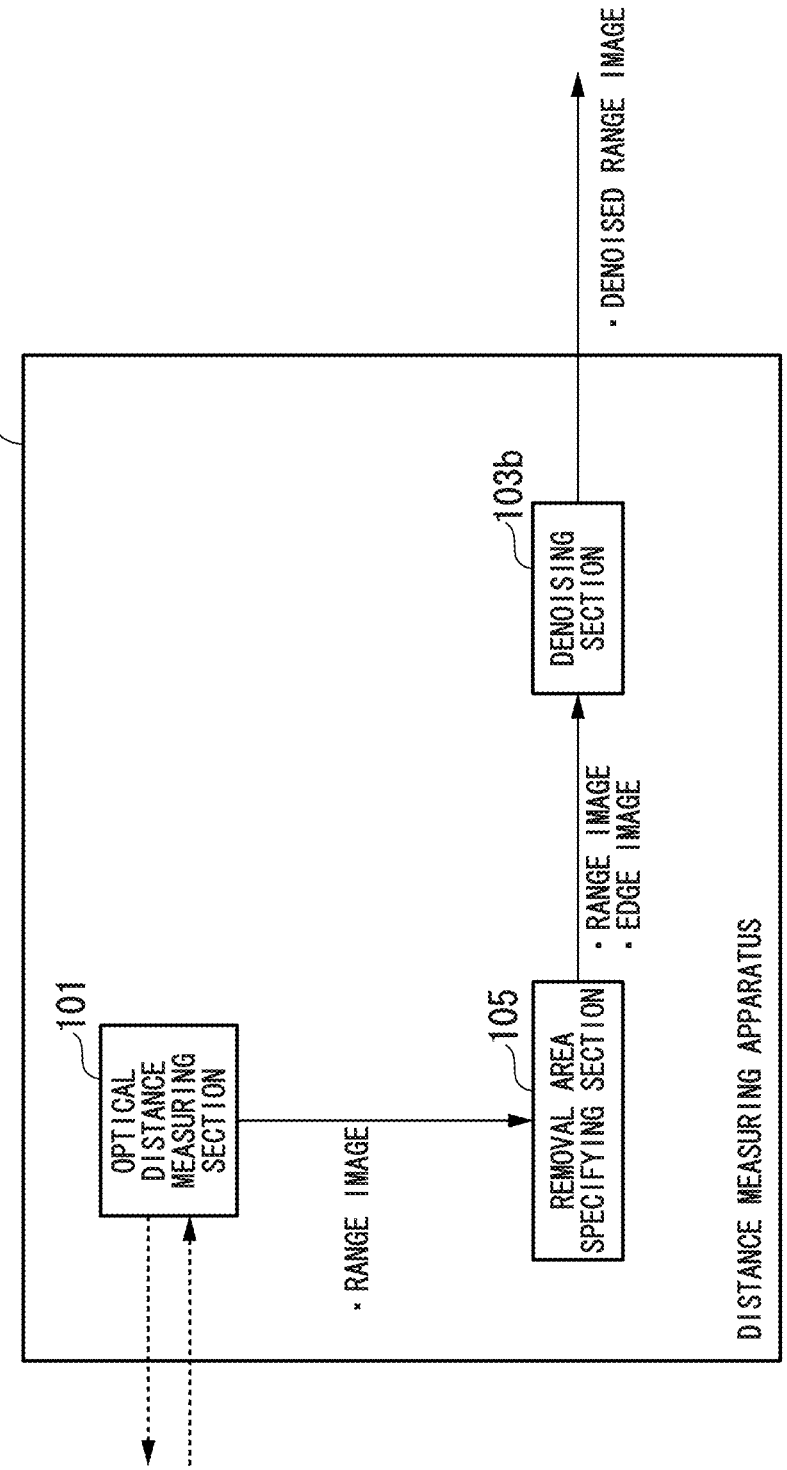
FIG. 10 is a schematic block diagram illustrating a functional configuration of a distance measuring apparatus according to a fourth embodiment.

FIG. 10 is a schematic block diagram illustrating a functional configuration of a distance measuring apparatus 10b according to the fourth embodiment. The distance measuring apparatus 10b according to the fourth embodiment is different from the distance measuring apparatus 10 according to the first embodiment in that a removal area specifying section 105 in place of the edge filter 102 and the denoising section 103b is provided in place of the denoising section 103, and the remaining configurations are the same as those of the distance measuring apparatus 10.

The removal area specifying section 105 specifies a removal area to be removed from a range image generated by the optical distance measuring section 101. The removal area is an area in which the accuracy of distance measurement is estimated to be low. More specifically, the removal area is an area in which a distance between a front part (a part closer to the optical distance measuring section 101) and a rear part (a part farther from the optical distance measuring section 101) rapidly varies. Hereinafter, a process when the removal area specifying section 105 specifies the removal area in a method based on a distance difference and a method based on an inter-regional difference will be described.

(Method Based on Distance Difference)

First, the method based on a distance difference will be described. The removal area specifying section 105 calculates a distance from a neighboring pixel for a certain pixel. When the calculated distance is greater than a preset threshold value, the removal area specifying section 105 determines that the pixel is part of a removal area. The neighboring pixel may be, for example, four upper, lower, left, and right pixels (four neighbors) or eight pixels (eight neighbors) including upper-right, lower-right, upper-left, and lower-left pixels in addition to the four upper, lower, left, and right pixels. In addition, a value to be compared to a threshold value may be a statistical value (for example, a sum value, an average value, a mode value, or the like) of differences from neighboring pixels, or one representative value among the differences from the neighboring pixels. The removal area specifying section 105 specifies a removal area in which the above-described process is performed for all pixels of a range image.

(Method Based on Inter-Regional Difference)

Next, the method based on inter-regional difference will be described. The removal area specifying section 105 sets an area constituted by a plurality of pixels close to a distance value according to the distance value of each pixel. Pixels not belonging to any area are specified as a removal area.

Any area setting method may be implemented. For example, the removal area specifying section 105 may set an area having a value of a distance (for example, a distance of □10 cm) within a predetermined range from a predetermined distance (for example, a distance to a wall already determined to be present) as the above-described area. In addition, the removal area specifying section 105 may approximate a plane based on a distance value of each pixel and set a set of pixels approximated to the same plane as the above-described area. The approximation of this plane can be implemented, for example, by applying a random sample consensus (RANSAC) technique as shown below.

In the RANSAC technique, the removal area specifying section 105 randomly selects three pixels from among pixels of a range image, and configures a plane by distance values of the three pixels. The removal area specifying section 105 calculates differences between the configured plane and distance values of other pixels, and selects pixels of which the calculated differences are within a predetermined threshold value. The removal area specifying section 105 counts the number of selected pixels. The removal area specifying section 105 iterates the above-described process, and sets a set of pixels selected when the largest number of pixels has been counted as the above-described area. An approximation target need not be limited to the plane, and the removal area specifying section 105 may perform approximation to a predetermined curved surface.

The denoising section 103b removes noise from a range image according to the removal area specified by the removal area specifying section 105. Specifically, the denoising section 103b removes distance data of a pixel included in the removal area among pixels of the range image as noise. The denoising section 103b outputs a range image after the removal as a denoised range image. The denoising section 103b removes noise, for example, by assigning "0 or "NULL" to a pixel value of each pixel included in the removal area. The removal area is an area in which a distance value rapidly varies or an area in which the accuracy of measurement is degraded. The denoising section 103b removes the area in which the accuracy of measurement is degraded as noise by performing the above-described process.

Figure 11:
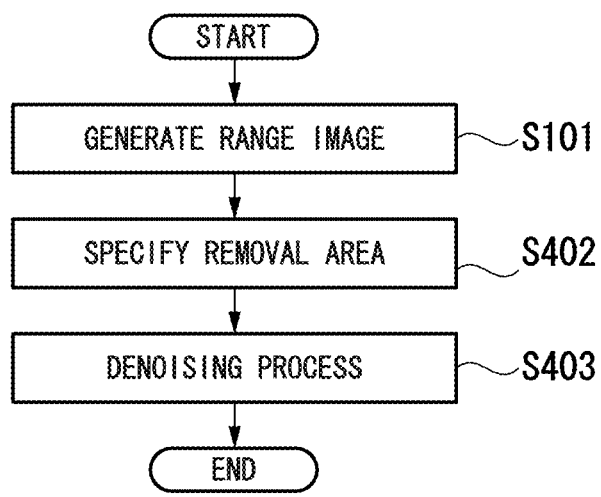
FIG. 11 is a flowchart illustrating a flow of processing of the distance measuring apparatus according to the fourth embodiment.

FIG. 11 is a flowchart illustrating a flow of processing of the distance measuring apparatus 10b according to the fourth embodiment. First, the optical distance measuring section 101 generates and outputs a range image (step S101). Next, the removal area specifying section 105 specifies a removal area from the range image (step S402). The denoising section 103b removes noise from the range image based on the specified removal area (step S403).

In the distance measuring apparatus 10b configured as described above, it is possible to specify an area (removal area) in which the accuracy of measurement is low without detecting an edge using the edge filter. Thus, even when a part of which a distance rapidly varies is included in a measurement area, it is possible to remove noise occurring in the above-described part. Therefore, it is possible to prevent the accuracy of measurement from being degraded due to noise.

Fifth Embodiment

Figure 12:
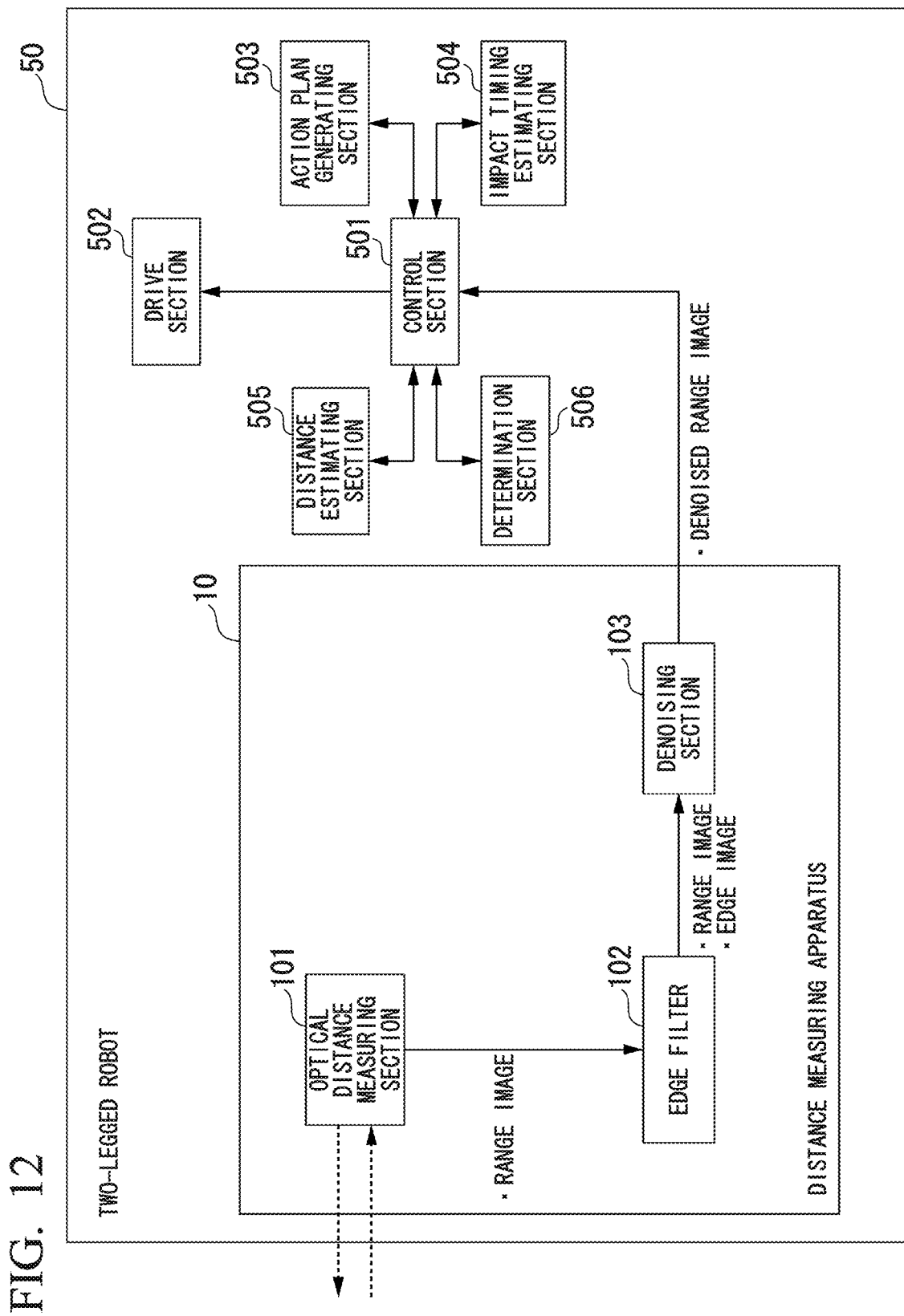
FIG. 12 is a schematic block diagram illustrating a functional configuration of a two-legged robot according to a fifth embodiment.

FIG. 12 is a schematic block diagram illustrating a functional configuration of a two-legged robot 20 according to the fifth embodiment. The two-legged robot 20 according to the fifth embodiment includes the distance measuring apparatus 10. The two-legged robot 20 generates an action plan based on a denoised range image generated by the distance measuring apparatus 10, and operates according to the action plan.

Hereinafter, the two-legged robot 50 will be described using FIG. 12. The two-legged robot 50 includes the distance measuring apparatus 10, a control section 501, a drive section 502, an action plan generating section 503, an impact timing estimating section 504, a distance estimating section 505, and a determination section 506.

The distance measuring apparatus 10 generates a range image around the two-legged robot 50, and outputs a denoised range image.

The control section 501 controls an operation of the two-legged robot. For example, the control section 510 determines which foot takes a step forward and makes a landing at which timing in which stride in which direction, and controls the drive section 502. In addition, the control section 501 performs pan, roll, or tilt control for the optical distance measuring section 101 of the distance measuring apparatus 10.

The drive section 502 causes a movable section of the two-legged robot to be driven according to control by the control section 501. According to driving of the drive section 502, the two-legged robot walks with two legs and moves an arm or head part. For example, when the optical distance measuring section 101 is provided on the head part, the pan, roll, or tilt of the optical distance measuring section 101 is made according to the movement of the head part. When the optical distance measuring section 101 is provided in a position other than the head part, the drive section 502 makes the pan, roll, or tilt by causing a movable section to be driven in the position.

The action plan generating section 503 determines a future action plan of the two-legged robot 50 based on a denoised range image or an output result of a sensor. The action plan represents a future movement destination, a moving speed, and the like.

The impact timing estimating section 504 previously estimates the timing (hereinafter referred to as "impact timing") when an impact to the optical distance measuring section 101 occurs based on control of the control section 501. An example of the impact to the optical distance measuring section 101 is an impact occurring at the timing when a foot of the two-legged robot 50 takes a step forward and makes a landing or an impact occurring at the timing when the optical distance measuring section 101 has been panned, rolled, or tilted.

The distance estimating section 505 detects an object imaged in a previous denoised range image, and estimates a distance to each object at the impact timing. Specifically, the distance estimating section 505 operates as follows. First, the distance estimating section 505 estimates a moving direction and a moving speed of each object based on denoised range images of a plurality of previous frames. The distance estimating section 505 estimates a position of each object at the impact timing based on the moving direction and the moving speed. In addition, the distance estimating section 505 estimates a position and direction of its own apparatus (two-legged robot) at the impact timing according to control by the control section 501 for the drive section 502 or an output result of an internal sensor. The distance estimating section 505 estimates a distance from its own apparatus to each object at the impact timing.

The determination section 506 assigns reliability to a denoised range image captured at the impact timing. The determination section 506 calculates a difference between a distance to each object in the denoised range image captured at the impact timing (hereinafter referred to as an "actual measured distance") and a distance to each object estimated by the distance estimating section 505 (hereinafter referred to as an "estimated distance"). If the calculated difference is greater than a predetermined threshold value, the determination section 506 determines that the reliability of the denoised range image is low. If the calculated difference is less than the predetermined threshold value, the determination section 506 determines that the reliability of the denoised range image is high.

Figure 13:
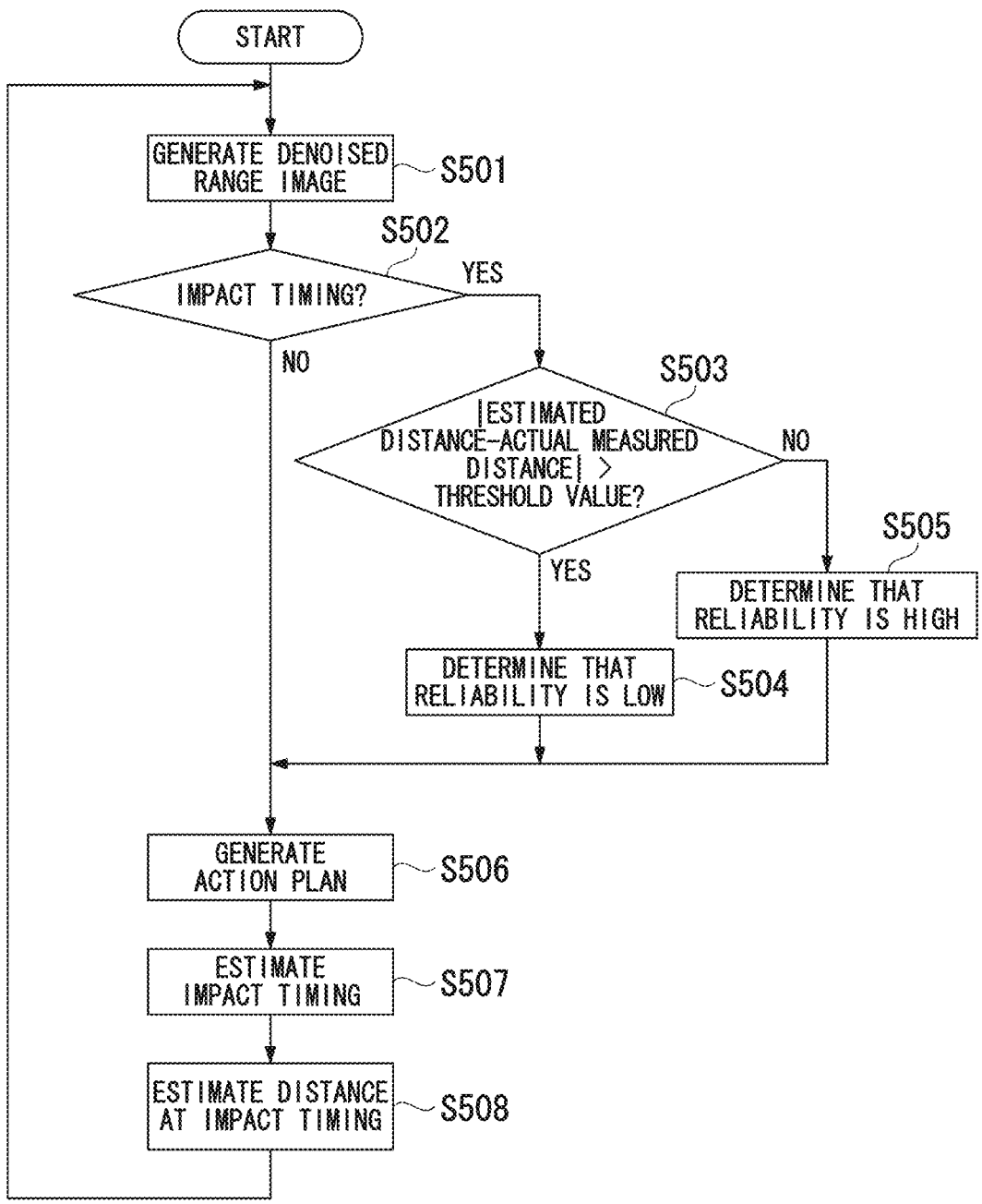
FIG. 13 is a flowchart illustrating a flow of processing of the two-legged robot according to the fifth embodiment.

FIG. 13 is a flowchart illustrating a flow of processing of the two-legged robot 20 according to the fifth embodiment. First, the distance measuring apparatus 100 generates a denoised range image (step S501). The determination section 506 determines whether or not the last generated denoised range image has been generated at an impact timing (step S502). If the last generated denoised range image has not been generated at the impact timing (step S502—NO), the action plan generating section 503 generates an action plan based on denoised range images generated so far (step S506). The impact timing estimating section 504 estimates the impact timing according to control of the control section 501 according to the action plan (step S507). The distance estimating section 505 estimates an estimated distance at the impact timing (step S508).

If the last generated denoised range image has been generated at the impact timing in step S502 (step S502—YES), the determination section 506 determines whether or not a difference between the estimated distance and the actual measured distance is greater than the threshold value (step S503). If the difference is greater than the threshold value (step S503—YES), the determination section 506 determines that the reliability of the denoised range image at the impact timing is low (step S504). On the other hand, if the difference is less than the threshold value (step S503—NO), the determination section 506 determines that the reliability of the denoised range image at the impact timing is high (step S505).

In the two-legged robot 50 configured as described above, it is possible to determine whether the reliability is high or low for a distance measurement result (denoised range image) at the impact timing. That is, in general, the accuracy of a result of distance measurement performed when the impact occurs is usually low. If a subsequent process is performed using the above-described measurement result, the accuracy of processing is degraded. On the other hand, because the reliability is not constantly low, it is desirable to effectively utilize a measurement result having high reliability without discarding the measurement result. The two-legged robot 50 calculates a difference between the estimated distance and the actual measured distance, and determines that the reliability is determined to be high if the difference is less than the threshold value. Thus, it is possible to effectively utilize a denoised range image determined to have high reliability, and prevent the accuracy of processing from being degraded based on a denoised range image determined to have low reliability.

For example, the control section 501 or the action plan generation section 503 may perform processing using only a denoised range image determined to have high reliability with respect to a denoised range image captured at the impact timing. According to this configuration, it is possible to prevent the accuracy of control by the control section 501 or a process of generating an action plan by the action plan generating section 503 from being degraded.

Modified Example

The two-legged robot 50 may be configured as a robot movable by other means without walking on two legs. In addition, in place of the distance measuring apparatus 10, one of the distance measuring apparatuses 10a and 10b may be provided in the two-legged robot 50. Further, in place of the distance measuring apparatus 10, the object extracting apparatus 20 may be provided in the two-legged robot 50. In this case, the control section 501 and the action plan control section 503 operate based on a result of object extraction by the object extracting apparatus 20. In addition, the control section 501 may associate and store a denoised range image and a determination result of its reliability.

A threshold value to be used by the edge filter 102 of the distance measuring apparatus 10 may be preset according to an error of an internal sensor. For example, an error occurring in the internal sensor of the two-legged robot 50 may be measured in advance and the threshold value may be set to a value equal to or greater than a maximum value of the error. In addition, the threshold value may be preset according to both the accuracy of measurement of the optical distance measuring section 101 and the error of the internal sensor. For example, the sum of a value equal to or greater than the maximum value of the error of the internal sensor and a value equal to or greater than the accuracy of measurement of the optical distance measuring section 101 may be selected as the threshold value.

Although the embodiments of the present invention have been described above with reference to the drawings, specific configurations are not limited to these embodiments, and designs can also be made without departing from the scope of the present invention.

INDUSTRIAL APPLICABILITY

The present invention is applied to an apparatus for generating a range image or an apparatus for performing processing using a range image.

REFERENCE SYMBOLS

10, 10a . . . Distance measuring apparatus (image processing apparatus)
20 . . . Object extracting apparatus (image processing apparatus)
30 . . . Noise area
101, 101a . . . Optical distance measuring section
102, 102b . . . Edge filter (edge extracting section)
103 . . . Denoising section (removing section)
104 . . . Preprocessing section
201 . . . Object extracting section
50 . . . Two-legged robot (movable body)
501 . . . Control section
502 . . . Drive section
503 . . . Action plan generating section
504 . . . Impact timing estimating section
505 . . . Distance estimating section
506 . . . Determination section

The invention claimed is:

1. A legged movable body comprising:
an optical distance measuring section;
an edge filter;
a denoising section;
a distance measuring apparatus;
a control section;
a drive section;
an action plan generating section;
an impact timing estimating section;
a distance estimating section; and
a determination section,
wherein:
the distance measuring apparatus comprises at least one processor, and at least one memory including computer program code, wherein the at least one memory and the computer program code are configured to, with the at least one processor, cause the distance measuring apparatus at least to perform distance measurement,
the distance measuring apparatus further comprises the optical distance measuring section, the edge filter, and the denoising section,
the optical distance measuring section measures a distance to an object reflecting light, and generates and outputs a range image representing the distance to the object,
the edge filter calculates an edge evaluation value for each pixel of the range image, and extracts a pixel having an edge evaluation value larger than a predetermined threshold value as an edge, and generates an edge image representing the extracted edge,
the denoising section removes distance data of a pixel serving as an edge part in the edge image as noise among each pixel of the range image, and generates a range image from which distance values of all the pixels serving as the edge part is removed as a denoised range image,
the at least one memory and the computer program code are configured to, with the at least one processor, cause the distance measuring apparatus at least to output the denoised range image,
the action plan generating section determines a movement destination and a moving speed of the legged movable body based on the denoised range image,
the control section determines, according to an action plan determined by the action plan generating section,
which foot of the legged movable body takes a step forward and makes a landing,
a timing, a stride, and a direction of the step taken by the movable body, and
controls of the drive section, or
the control section performs a panning, rolling, or tilting control for the optical distance measuring section of the distance measuring apparatus,
the drive section causes a movable section of the legged movable body to be driven according to controls by the control section, and causes the legged movable body to walk, the impact timing estimating section estimates, based on a control of the control section, an impact timing, wherein the impact timing comprises a time it takes for light emitted from the optical distance measuring section of the legged movable body to reflect from the object and impact the optical distance measuring section, the distance estimating section estimates
- a moving direction and a moving speed of the object based on a previous denoised range image,
- a position of the object at the impact to the optical distance measuring section of the legged movable body based on the moving direction and the moving speed of the object,
- a position and a direction of the legged movable body at the impact to the optical distance measuring section of the legged movable body, and
- a distance from the legged movable body to the object at the impact to the optical distance measuring section of the legged movable body, the determination section measures an actual measured distance to the object in the denoised range image captured at the impact timing, and determines reliability of the denoised range image by comparing the actual measured distance to the object in the denoised range image with the estimated distance to the object estimated by the distance estimating section.

* * * * *